(12) United States Patent
Shelby et al.

(10) Patent No.: US 11,212,876 B2
(45) Date of Patent: Dec. 28, 2021

(54) HOME POWER DISTRIBUTION WITH MULTIPHASE BRIDGING

(71) Applicant: Coherent Logix, Incorporated, Austin, TX (US)

(72) Inventors: Kevin A. Shelby, Austin, TX (US); Michael B. Doerr, Dripping Springs, TX (US); Michael B. Solka, Austin, TX (US); Yama Yasha, Taipei (TW)

(73) Assignee: Coherent Logix, Incorporated, Austin, TX (US)

( * ) Notice: Subject to any disclaimer, the term of this patent is extended or adjusted under 35 U.S.C. 154(b) by 137 days.

(21) Appl. No.: 16/697,775

(22) Filed: Nov. 27, 2019

(65) Prior Publication Data

US 2020/0178355 A1    Jun. 4, 2020

Related U.S. Application Data

(60) Provisional application No. 62/772,706, filed on Nov. 29, 2018.

(51) Int. Cl.
*H04W 88/08* (2009.01)
*H04W 4/80* (2018.01)
(Continued)

(52) U.S. Cl.
CPC ............ *H04W 88/08* (2013.01); *H02J 1/02* (2013.01); *H04W 4/80* (2018.02); *H04W 84/12* (2013.01);
(Continued)

(58) Field of Classification Search
CPC ....... H04W 88/08; H04W 88/16; H04W 4/80; H04W 88/06; H04W 92/02; H04W 84/12;
(Continued)

(56) References Cited

U.S. PATENT DOCUMENTS 7,392,053 B1 * 6/2008 Conner ................. H04W 40/04
                                                          455/445
7,852,837 B1   12/2010 Au et al.
(Continued)

FOREIGN PATENT DOCUMENTS

| CN | 105450258 A | 3/2016 |
| KR | 20030028217 A | 4/2003 |
| KR | 20130022363 A | 3/2013 |

OTHER PUBLICATIONS

Office Action in ROC (Taiwan) Pat. Appln. No. 108143800, dated Sep. 2, 2020, 11 pgs.
(Continued)

*Primary Examiner* — Brandon J Miller
(74) *Attorney, Agent, or Firm* — Kowert, Hood, Munyon, Rankin & Goetzel, P.C.

(57) ABSTRACT

Methods and devices for a home power networking system including a first wireless access point (AP) configured to perform wired communications over a first circuit connected to the first wireless AP. The first wireless AP further performs wireless communications with a second wireless AP, wherein the second wireless access point is connected to a second circuit and is not connected to the first circuit. The first wireless AP provides wireless transport through the second wireless AP to bridge communications between the first circuit and the second circuit.

15 Claims, 8 Drawing Sheets

(51) Int. Cl.
  *H02J 1/02* (2006.01)
  *H04W 84/12* (2009.01)
  *H04W 88/06* (2009.01)
  *H04W 88/16* (2009.01)
  *H04W 92/02* (2009.01)

(52) U.S. Cl.
  CPC ........... *H04W 88/06* (2013.01); *H04W 88/16* (2013.01); *H04W 92/02* (2013.01)

(58) Field of Classification Search
  CPC ............... H04L 12/4625; H04B 3/54; H04B 2203/5445; H02J 1/02
  See application file for complete search history.

(56) References Cited

U.S. PATENT DOCUMENTS

| | | | |
|---|---|---|---|
| 2007/0002876 A1 | 1/2007 | Berkman et al. | |
| 2007/0271398 A1* | 11/2007 | Manchester | H04L 12/2836 709/249 |
| 2008/0192629 A1 | 8/2008 | Chari | |
| 2008/0225687 A1* | 9/2008 | Oksman | H04L 41/0893 370/201 |
| 2013/0002409 A1* | 1/2013 | Molina | H04B 3/542 340/12.32 |
| 2013/0101003 A1* | 4/2013 | Vedantham | H04B 3/54 375/224 |
| 2016/0148499 A1* | 5/2016 | Hicks, III | H04L 12/6418 340/506 |
| 2016/0182252 A1 | 6/2016 | Razdan et al. | |
| 2016/0295628 A1 | 10/2016 | Allanki et al. | |
| 2018/0183666 A1* | 6/2018 | Likar | H04L 41/0809 |

OTHER PUBLICATIONS

Vladimir Oksman (Infineon Technologies), Stefano Galli (Panasonic Corporation), "G.hn: The New ITU-T Home Networking Standard", IEEE Communications Magazine, Oct. 2009, 8 pgs.
Recommendation ITU-T Study G.9960, "Unified high-speed wireline-based home networking transceivers—System architecture and physical layer specification", ITU-T Study Group 15, Ed. 4.0, Jul. 2015, 162 pgs.
Recommendation ITU-T G.9964 (2011) Amd. 2, "Unified high-speed wireline-based home networking transceivers—Power spectral density specification", ITU-T Study Group 15, Sep. 2016, 30 pgs.
International Search Report and Written Opinion for International Patent Application No. PCT/US2019/063660 dated Oct. 2, 2020, 10 pages.
International Preliminary Report on Patentability for International Patent Application No. PCT/US2019/063660 dated Oct. 6, 2021, 8 pages.

* cited by examiner

| | OFDM Control Parameters – ref: Recommendation ITU-T G.9964 | | | | | | | | | |
|---|---|---|---|---|---|---|---|---|---|---|
| Domain Type | Phone-Line Baseband | | Power-Line Baseband | | | Coax Baseband | | Coax RF | | Units |
| Band Plan | 50 MHz-TB | 100 MHz-TB | 25 MHz-PB | 50 MHz-PB | 100 MHz-PB | 50 MHz-CB | 100 MHz-CB | 50 MHz-CRF | 100 MHz-CRF | |
| Parameter | | | | | | | | | | |
| $n$ | 10 | 11 | 10 | 11 | 12 | 8 | 9 | 8 | 9 | |
| $N$ | 1024 | 2048 | 1024 | 2048 | 4096 | 256 | 512 | 256 | 512 | |
| $F_{SC}$ | 50 | 100 | 25 | 50 | 100 | 50 | 100 | 50 | 100 | MS/s |
| $\Delta f$ | 48.83 | 48.83 | 24.41 | 24.41 | 24.41 | 195.31 | 195.31 | 195.31 | 195.31 | kHz |
| $T_{FFT}$ | 20.48 | 20.48 | 40.96 | 40.96 | 40.96 | 5.12 | 5.12 | 5.12 | 5.12 | µs |

FIG. 1

HOME POWER DISTRIBUTION WITH MULTIPHASE BRIDGING

PRIORITY CLAIM

This application claims benefit of priority to U.S. Provisional Application No. 62/772,706 titled "Home Power Distribution with Multiphase Bridging" and filed on Nov. 29, 2018 which is hereby incorporated by reference in its entirety as if fully and completely set forth herein.

FIELD OF THE INVENTION

The field of the invention generally relates to home networking systems, and in particular wired and wireless communication interworking.

DESCRIPTION OF THE RELATED ART

Modern homes typically utilize a plurality of wired and wireless electronic devices, which may operate on two or more wired circuits. Effectively operating a home networking system to accommodate an increasing number and variety of types of these devices may present technical difficulties. Accordingly, improvements in the field are desired.

SUMMARY OF THE EMBODIMENTS

Various embodiments are described related to home networking systems and wireless access points (APs) configured to interwork between wired and wireless communication media.

In some embodiments, a first wireless AP performs wired communications over a first circuit connected to the first wireless AP, and performs wireless communications with a second wireless AP, wherein the second wireless access point is connected to a second circuit and is not connected to the first circuit.

In some embodiments, the first wireless AP provides wireless transport through the second wireless AP to bridge communications between the first circuit and the second circuit.

In some embodiments, the first wireless AP and the second wireless AP may both be connected to the first circuit, and the first and second wireless APs may not be able to wirelessly communicate with each other. In these embodiments, an alien bridge may be configured within the first wireless AP, and the alien bridge may be configured to establish communication between the first wireless AP and the second wireless AP via the first circuit.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention may be obtained when the following detailed description of the preferred embodiment is considered in conjunction with the following drawings, in which:

FIG. 1 is a table illustrating orthogonal frequency division multiplexing (OFDM) control parameters for various wired communication technologies, according to some embodiments;

Figure 2:
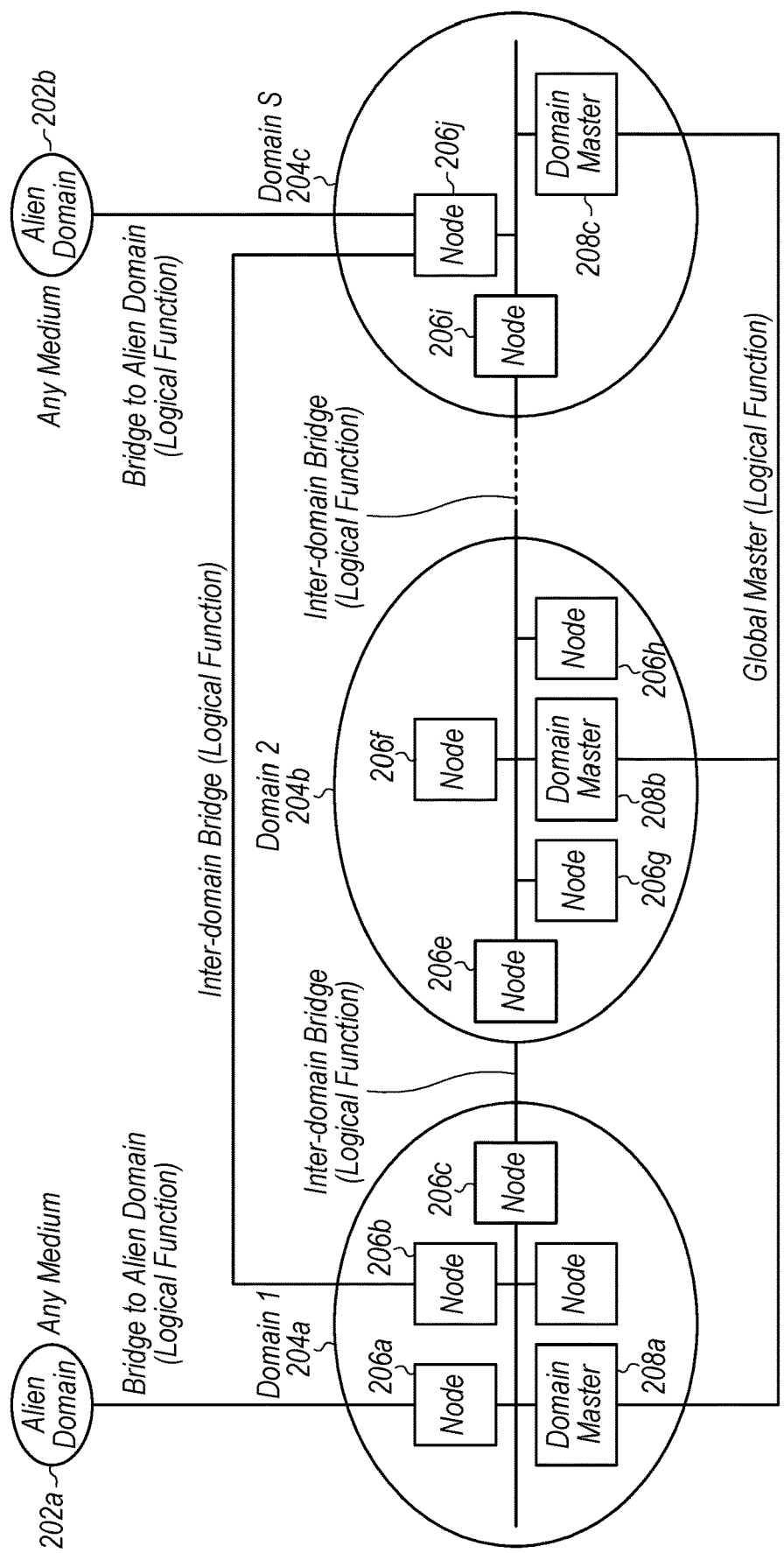
FIG. 2 is a schematic diagram illustrating a plurality of nodes in separate domains of a home networking system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Terms

The following is a glossary of terms used in the present application:

Memory Medium—any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, optical storage, or ROM, EPROM, FLASH, etc. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical or optical signals.

Programmable Hardware Element—includes various hardware devices comprising multiple programmable function blocks connected via a programmable or hardwired interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Application Specific Integrated Circuit (ASIC)—this term is intended to have the full breadth of its ordinary meaning. The term ASIC is intended to include an integrated circuit customized for a particular application, rather than a general purpose programmable device, although an ASIC may contain programmable processor cores as building blocks. Cell phone processors, MP3 player chips, and many other single-function ICs are examples of ASICs. An ASIC is usually described in a hardware description language such as Verilog or VHDL.

Program—the term "program" is intended to have the full breadth of its ordinary meaning. The term "program" includes 1) a software program which may be stored in a memory and is executable by a processor or 2) a hardware configuration program useable for configuring a programmable hardware element or ASIC.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, e.g., imperative or procedural languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element or ASIC.

Computer System—any of various types of computing or processing systems, including a personal computer system (PC), mainframe computer system, workstation, network appliance, Internet appliance, personal digital assistant (PDA), grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™ Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system may update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Home Networking

Embodiments herein present methods, systems, and devices to improve connectivity and functionality within a home networking scenario. G.hn is one example of a unified wired home networking standard. Embodiments herein may be employed within the context of the G.hn standard, or alternatively they may be implemented within other home networking scenarios. The G.hn standard deviates from some other approaches taken to standardize home networking, which typically utilize a single medium (e.g., a power line, twisted-pair phone line, or coaxial cable). Instead, as shown in FIG. 1, G.hn defines a unified transmission protocol optimized for multiple media, such as phone-line baseband, power-line baseband, coax baseband, and coax radio frequency (RF) media.

A G.hn network may consist of one or more domains, as illustrated in FIG. 2. In G.hn, a domain may constitute all nodes that can directly communicate and/or interfere with each other. More specifically, G.hn defines power line, coax, and twisted pair as separate domains. As used herein, a "domain" may be taken to refer to the set of all nodes that can directly communicate with each other, through either wired or wireless communications. As one example, a power line carrier (PLC), a wireless access point (AP) connected through a wired connection to the PLC, and the set of wireless devices camped on the wireless AP may all be understood to exist within a single domain. In some embodiments, a single power drop may branch into two or more separate PLCs that are routed to different areas of a home, where each PLC operates on an orthogonal phase to the other PLCs. In these embodiments, each PLC, together with any devices connected directly or indirectly to the respective PLC, may constitute a respective domain. Furthermore, as used herein, the term "circuit" may be used to refer to a particular wired connection (e.g., one of the plurality of PLCs, in some embodiments).

Accordingly, interference typically does not occur between different domains of the same network, with the possible exception of crosstalk between closely routed wires. In some embodiments, one of the nodes may be chosen as the domain master (DM). The DM may control operation of all nodes in the domain, including admission to the domain, bandwidth reservation, resignation, and other management operations. In some embodiments, if a DM fails, the DM function may be passed to another node in the domain.

Figure 3:
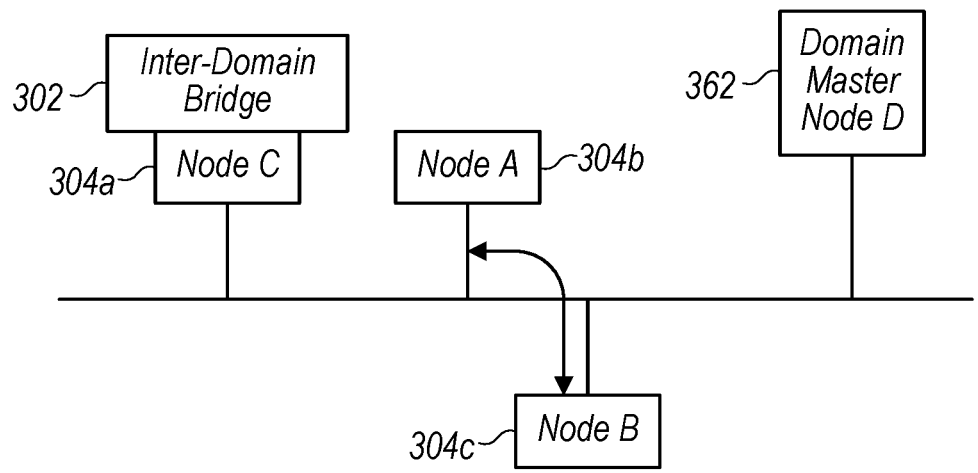
FIG. 3 is a diagram illustrating direct node-to-node communication, according to some embodiments.

A domain may operate in one of three modes: peer-to-peer mode (PM), centralized mode (CM), or unified mode (UM). Different domains within the home network may use different ones of these modes of operation. In PM, only peer-to-peer (P2P) communications may be utilized in the domain. Accordingly, as illustrated in FIG. 3, direct signal traffic may be established between two communicating nodes (e.g., between nodes A and B). Frames addressed to nodes outside the domain may be sent to the node associated with the inter-domain bridge. In other words, the inter-domain bridge 302 associated with node C 304a may serve as an intermediary to route traffic outside of the illustrated domain, while the domain master node D 362 may control operation (e.g., direct traffic and scheduling) of the other nodes within the domain. In some embodiments (not illustrated in FIG. 3) the inter-domain bridge may be located on the domain master node.

Inter-Domain Bridging

Figure 4:
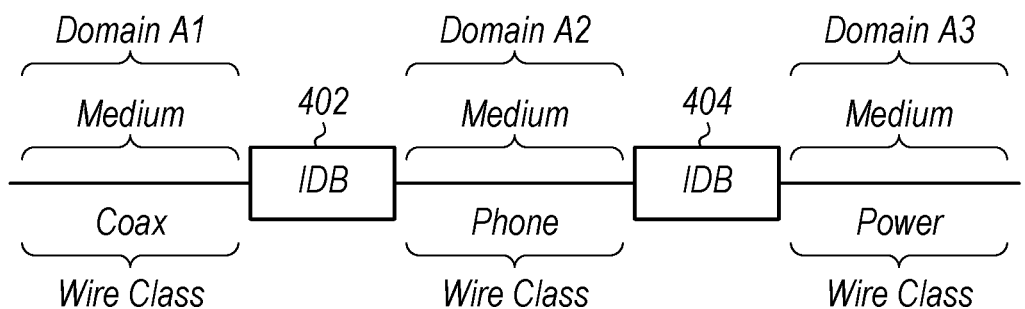
FIG. 4 illustrates how inter-domain bridges transport communications between different wire classes, according to some embodiments.

The inter-domain bridge (IDB) may be utilized to interconnect different media, as described within the G.hn standard or in other home networking standards. For example, as illustrated in FIG. 4, the IDB may bridge coax cable and phone line domains, or phone line and power line domains.

Figure 5:
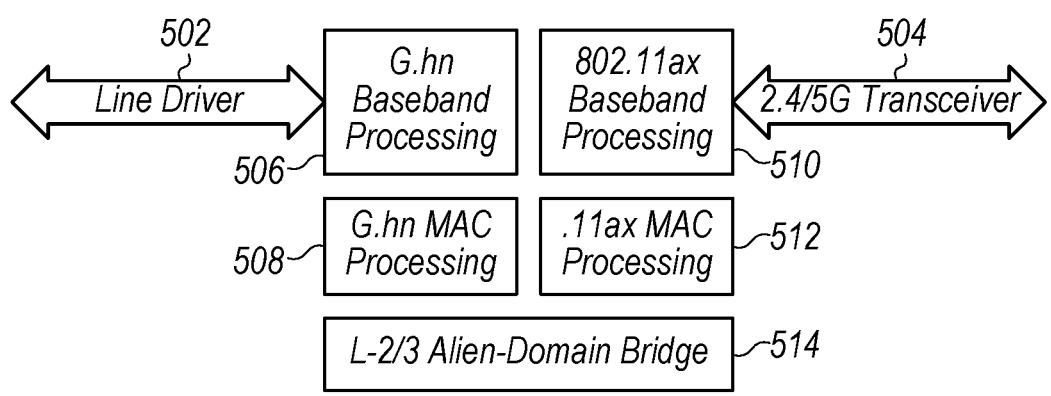
FIG. 5 is a protocol stack diagram illustrating an alien-domain bridge, according to some embodiments.

In some embodiments, wired home networking standards may not include a provision for bridging with alien domains (e.g. for bridging with 802.11/Bluetooth™/Z-Wave™/Zigbee™/Wi-SUN™ wireless networks). FIG. 5 depicts an example protocol stack for a bridge between the G.hn network and an alien wireless domain (802.11ax in the example shown), the intent of which is to provide wireless devices access to gateways and other resources in the G.hn wired home network.

Figure 6:
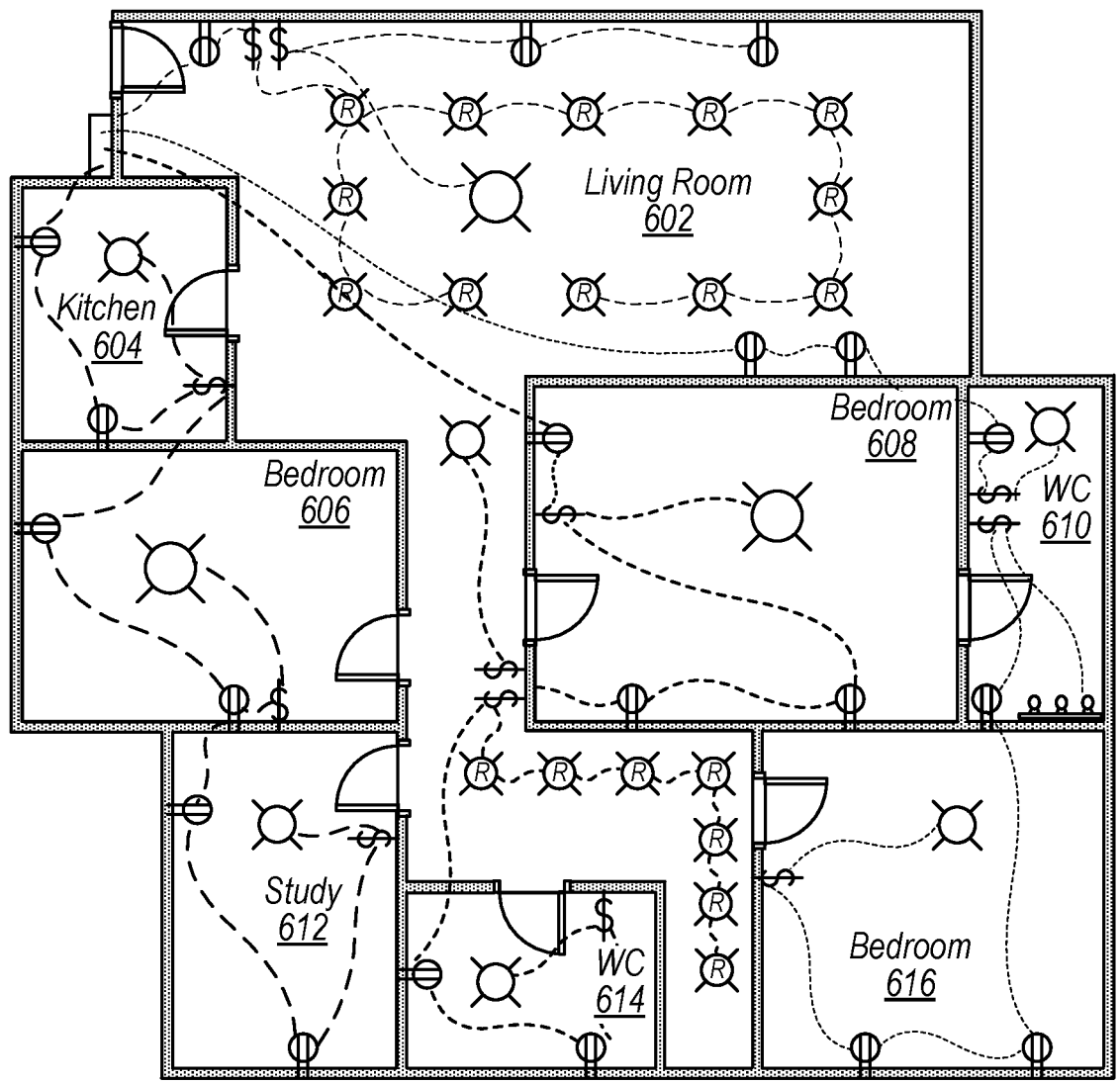
FIG. 6 is a top-down illustration of a home networking system including a plurality of circuits deployed in a home, according to some embodiments.

Previous implementations to extend home networking facilities to wireless devices may fail to address an important consideration encountered in home wiring arrangements. For example, a typical home wiring plan may distribute runs over multiple separate circuits operating in multiple respective phases from a primary power drop to the home, as shown in the example home wiring plan illustrated in FIG. 6. As illustrated, FIG. 6 shows four separate circuits indicated in dashed lines with dashes of different lengths emanating from a common drop into the home (top left of FIG. 6). In some embodiments, each of the plurality of circuits may connected to a common ground, and they may be communicatively separated from each other by operating according to mutually orthogonal phases, isolating any domain present on one phase from those on another.

Figure 7:
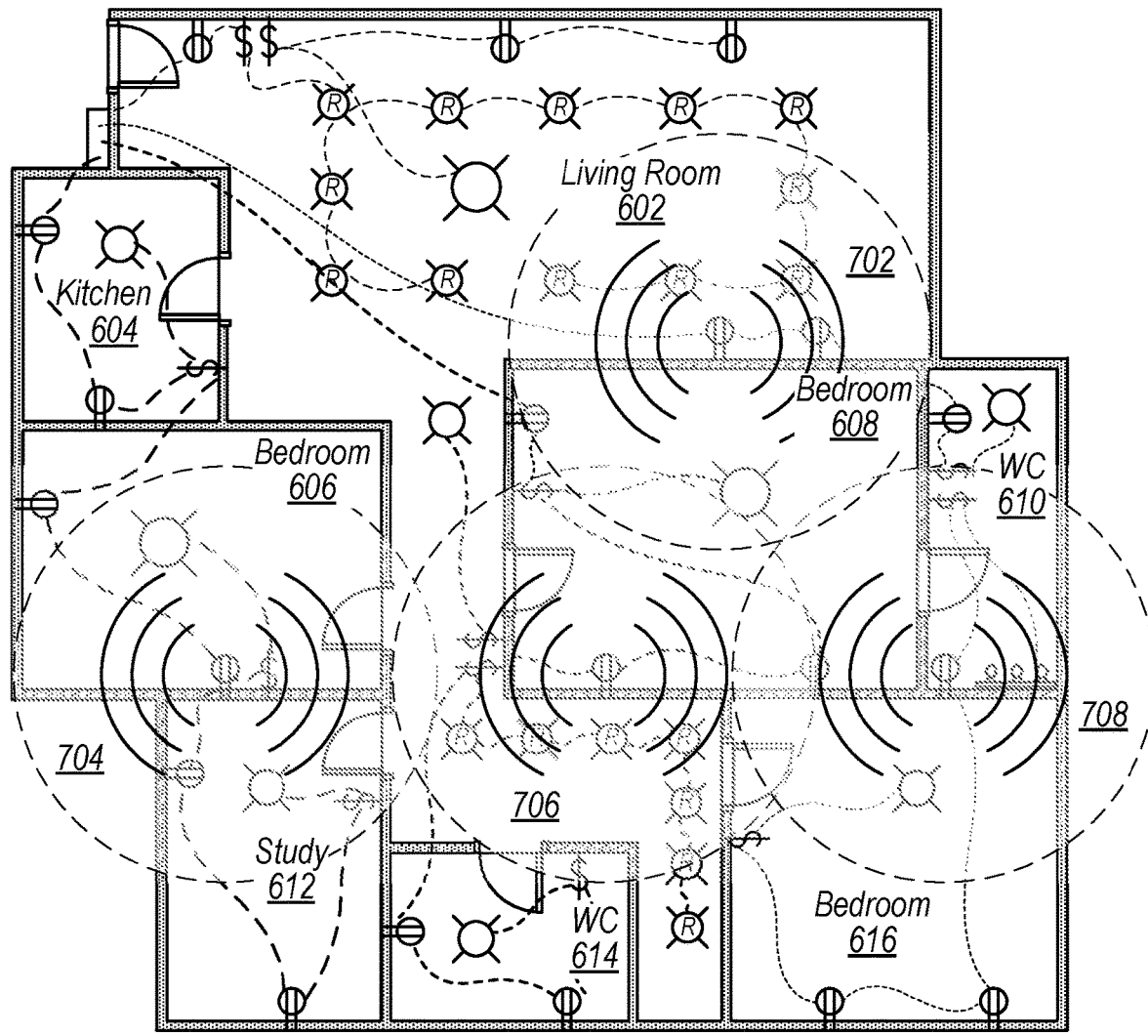
FIG. 7 illustrates the home networking system of FIG. 6 and further illustrates the coverage range of four wireless access points of the home networking system.

As illustrated in FIG. 7, each of the separate circuits may be connected to a respective wireless AP. FIG. 7 illustrates the coverage areas of each of these wireless APs, which at least partially overlap in their coverage areas so that, for example, wireless AP 706 may be capable of communicating wirelessly with wireless AP 708.

Multiphase Wireless Bridging

In some embodiments, in a multiphase power distribution network, wireless transport may be configured by a wireless AP to bridge disparate phases (i.e., between separate circuits) of the installed wiring plant. The wireless transport may seamlessly interconnect phases of the wireless distribution that are otherwise not visible to one another. This may be in addition to and coincident with the primary task of a wireless AP of granting wireless devices access the wired home network.

In some embodiments, a wired-to-wireless bridge may be provided at each wireless access point (AP), which may provide access for a set of associated client devices to the wired network facilities. In some embodiments, a deliberate overlap between wireless APs may be utilized in coverage areas to permit internetworking between power phases. In some embodiments, multi-band and/or multi-channel operation may permit each AP to service its wireless client base coincident with its internetworking responsibilities.

While some embodiments herein are described in reference to the G.hn home networking standard, other embodiments may apply methods and devices described herein to other networking standards and wired communication technologies, such as HomePlug™, HomePlug AV™, HomePlug AV2™, and HD-PLC™, among other possibilities. Further, the wireless technology utilized for performing wireless communications may be of a variety of types, such as WiFi, Bluetooth™, Z-Wave™ Zigbee™, or Wi-SUN™, among other possibilities. In some embodiments, operation may be allowed of multiple standard waveforms in parallel. Advantageously, this may permit proprietary extensions to tune wireless transport. For example, tailored bin loading may be utilized to avoid noise and/or interference or otherwise account for uneven channel capacity. In some embodiments, auto-sensing on a wired network may enable each wireless AP to determine which other wireless AP nodes are able talk to it via signals over the wired connection. For example, there may be two or more wireless AP nodes physically connected to the same wired circuit. Each pair of APs on a wired circuit may exchange signals to determine the available bandwidth between them, and this information may be communicated to a domain master node to improve network traffic routing.

In some embodiments, automated discovery may permit nodes distributed throughout the wired domain to advertise their availability and/or ascertain the availability of other nodes within the domain, independent of the phase to which each is connected. For example, each wireless AP may advertise its traffic availability to one or more other wireless APs. Tailored routing between nodes may reduce internetworking latency and increase overall system throughput. For example, the DM node may determine dynamic traffic routing based at least in part on the availability of one or more APs, whereby traffic is routed to more available APs to reduce internetworking latency and increase overall system throughput, in some embodiments. Additionally or alternatively, dynamic traffic routing may be performed by the DM node based at least in part on available wired and/or wireless bandwidth, which may vary dynamically depending on circuit loading and the movement of active devices in the building.

In some embodiments, frequency reuse may allow the network to be tailored to dynamically alter the availability of one phase of the power distribution, if desired, to accommodate a particular traffic load. For example, video or other media distribution may be confined to one portion of the home. Advantageously, this may extend the reach of the conventional wired-to-wireless (i.e. alien domain) bridge without adversely affecting operation of the multiphase wireless bridge.

Figure 8:
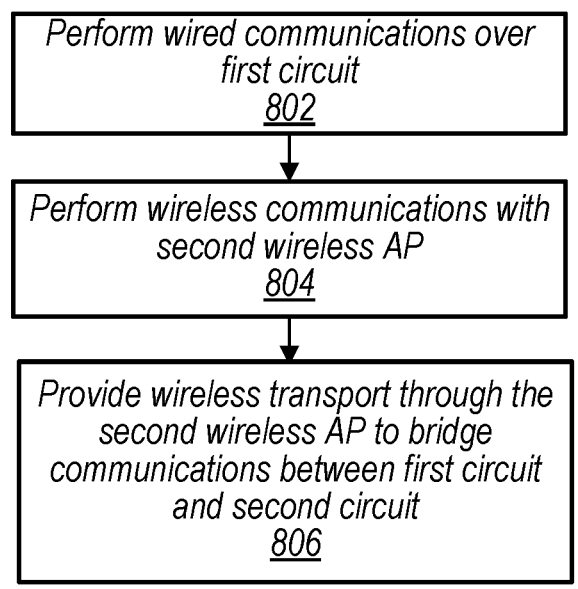
FIG. 8 is a flowchart diagram illustrating a method for providing wireless transport to bridge communications between a first circuit and a second circuit, in some embodiments.

FIG. 8—Flowchart for Circuit Bridge

FIG. 8 is a flowchart diagram illustrating a method for a wireless AP to serve as a bridge between separate circuits of a home networking system, according to some embodiments. Note that while elements of the method of FIG. 8 are described substantially with reference to home networking technology, part or all of the method may be used in conjunction with other networking technologies and wired and wireless communication technologies, as desired. In some embodiments the wired communications over a circuit of the home networking system may include communications over a power line carrier, a coax cable, a phone line, or another type of power line. Additionally, the wireless communications by the wireless APs may include WiFi or another type of WLAN communication. However, in other embodiments one or both of the wired and wireless communications may operate according to other types of communication technologies, as desired. The method shown in FIG. 8 may be used in conjunction with any of the computer systems or devices shown in the above Figures, among other devices. In various embodiments, some of the elements shown may be performed concurrently, in a different order than shown, substituted for by other elements, or may be omitted. Additional elements may also be performed as desired. As shown, the method may operate as follows.

At 802, a first wireless AP performs wired communications over a first circuit connected to the wireless AP. In some embodiments, the first circuit may include a power line carrier (PLC) implemented as part of a home networking system, and the first wireless AP may be connected through a wired connection to the first circuit. The first circuit may be one of a plurality of circuits that branch out from a primary power drop into a home, and each circuit of the plurality of circuits may operate according to mutually orthogonal phases. Even though the plurality of circuits may share a common ground, in some embodiments, the plurality of circuits may be communicatively insulated from each other.

In some embodiments, the first circuit may be communicatively coupled to an external network. For example, the home may subscribe to an internet service that is delivered to the first wireless AP via the first circuit, and the first wireless AP may in turn be configured to provide that service to a plurality of wireless devices within wireless range of the wireless AP.

At 804, the first wireless AP performs wireless communications with a second wireless AP, wherein the second wireless AP is connected to a second circuit and is not connected to the first circuit. For example, the first and second APs may overlap in their coverage areas, such that they are capable of wirelessly communicating with each another. In some embodiments, the first and second circuits may be ones of the plurality of circuits originating from the primary power drop. For example, the first and second circuits may correspond to two of the circuits illustrated in FIG. 6, and the first and second wireless APs may correspond to the respective wireless APs illustrated in FIG. 7, as one example. In some embodiments, each of the first and second wireless APs further provide wireless communication services to one or more respective wireless devices. The first wireless AP, the second wireless AP, the first circuit, and the second circuit may all be part of a home power distribution system.

At 806, the first wireless AP provides wireless transport through the second wireless AP to bridge communications between the first circuit and the second circuit. In some embodiments, in bridging between the first circuit and the second circuit, the first wireless AP is configured to provide an alien bridge from a wired domain associated with the first circuit and a wireless domain associated with the second wireless AP. For example, the first wireless AP may utilize a protocol stack similar to that illustrated in FIG. 5, to route communications from the wired communication medium to the wireless communication medium, and/or vice versa. Advantageously, In some embodiments, each of the first and second circuits operate according to a separate power phase, and providing wireless transport to bridge between the first and second circuits enables internetworking between disparate power phases. In some embodiments, the wireless AP is configured to automatically detect a phase of a power distribution of the first circuit.

In various embodiments, each of the first and second wireless APs may operate according to any of a variety of wireless technologies, including but not limited to WiFi, Bluetooth™, Z-Wave™, Zigbee™, or Wi-SUN™.

In some embodiments, the first wireless AP is designated as a domain master. In these embodiments, the first wireless AP may receive an advertised availability from the second AP (and potentially from one or more additional APs), and may route traffic based at least in part on the advertised availability to accomplish one or both of reduced internetworking latency and increased overall system throughput.

Figure 9:
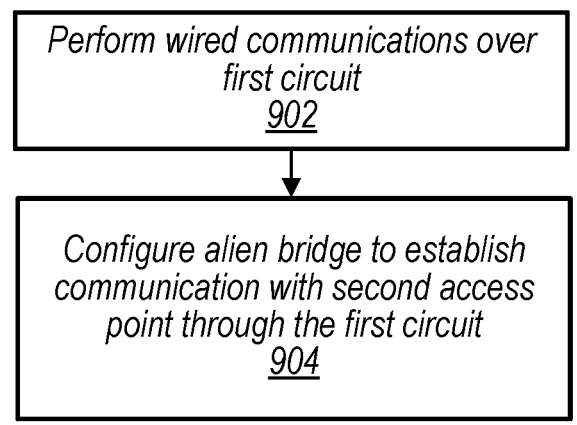
FIG. 9 is a block diagram illustrating an example wireless access point, according to some embodiments.

FIG. 9—Bridge Between Wireless Access Points

FIG. 9 is a flowchart diagram illustrating a method for a wireless AP to serve as a bridge to another wireless access point on a single circuit of a home networking system, according to some embodiments. In some embodiments, the first wireless AP and the second wireless AP may both be connected to a first circuit, and the first and second wireless APs may not be able to wirelessly communicate with each other. For example, the first and second wireless APs may each be connected through a wired connection with a PLC, but may not be in wireless communicative range of each other (e.g., either because of the distance between them and/or because of intervening walls, etc.). In these circumstances, the method steps described in reference to FIG. 9 provide means to establish communication between the first and second wireless APs using an alien bridge, as described in greater detail below.

Note that while elements of the method of FIG. 9 are described substantially with reference to home networking technology, part or all of the method may be used in conjunction with other networking technologies and wired and wireless communication technologies, as desired. In some embodiments the wired communications over a circuit of the home networking system may include communications over a power line carrier, a coax cable, a phone line, or another type of power line. Additionally, the wireless communications by the wireless APs may include WiFi or another type of WLAN communication. However, in other embodiments one or both of the wired and wireless communications may operate according to other types of communication technologies, as desired. The method shown in FIG. 9 may be used in conjunction with any of the computer systems or devices shown in the above Figures, among other devices. In various embodiments, some of the elements shown may be performed concurrently, in a different order than shown, substituted for by other elements, or may be omitted. Additional elements may also be performed as desired. As shown, the method may operate as follows.

At 902, a first wireless AP performs wired communications over a first circuit. A second wireless AP may also be connected to the first circuit and configured to perform wired communications over the first circuit. However, the first and second wireless APs may be out of wireless communicative range of one another. For example, the first and second wireless APs may be separated by a large distance or a thick insulating wall (e.g., concrete or steel) such that they are each unable to receive a sufficiently strong signal from the other AP to effectively communicate.

The first wireless AP, the second wireless AP, and the first circuit may all be part of a home power distribution system. The home power distribution system may further include a primary power drop branching into a plurality of circuits including the first circuit, and each circuit of the plurality of circuits may operate according to a separate power phase.

At 904, an alien bridge may be configured within the first wireless AP, and the alien bridge may be configured to establish communication between the first wireless AP and the second wireless AP via the first circuit. The first and second wireless access points may each be configured to provide wireless communication services to one or more respective wireless devices. In establishing communication between the first wireless access point and the second wireless access point through the first circuit, the alien bridge may be provided from a wired domain associated with the circuit to a wireless domain associated with the second wireless access point.

In some embodiments, the first wireless access point is designated as domain master, and the first wireless access point is further configured to receive an advertised availability from the second access point. The first wireless device may then route traffic based at least in part on the advertised availability to accomplish one or both of reduced internetworking latency and increased overall system throughput.

Figure 10:
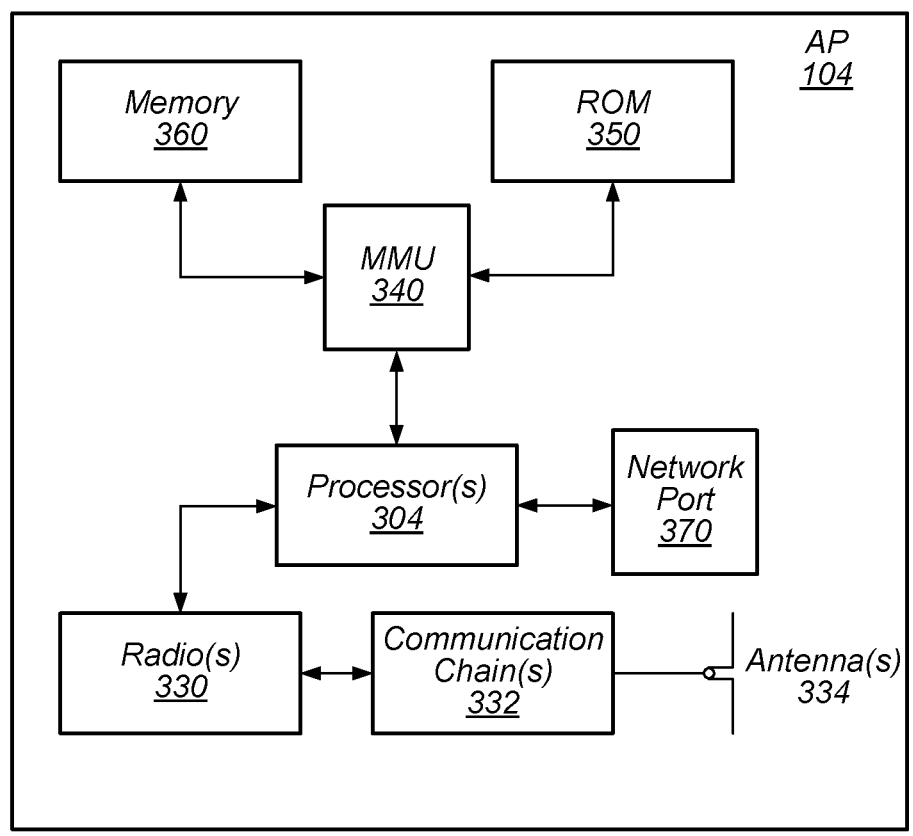
FIG. 10 illustrates an example block diagram of a wireless access point (AP), according to some embodiments.

FIG. 10—Block Diagram of a Wireless Access Point

FIG. 10 illustrates an example block diagram of a wireless access point (AP) 104, according to some embodiments. It is noted that the AP of FIG. 10 is merely one example of a possible AP. As shown, the AP 104 may include processor(s) 304 which may execute program instructions for the access point 104. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The AP 104 may include at least one network port 370. The network port 370 may be configured to couple through a wired connection to a remote network such as a telephone or internet network and provide a plurality of devices, such as user equipment (UE) devices, access to the network as part of a home networking system.

The network port 370 (or an additional network port) may also or alternatively be configured to couple to a cellular network, e.g., a core network of a cellular service provider. The core network may provide mobility related services and/or other services to a plurality of devices, such as UE devices. In some cases, the network port 370 may couple to a telephone network via the core network, and/or the core network may provide a telephone network (e.g., among other UE devices serviced by the cellular service provider).

The AP 104 may include at least one wireless transceiver, which may include one or more radios 330, one or more communication chains 332 and one or more antennas 334. The wireless transceiver and may be further configured to communicate with UE device. Communication chain 332 may be a receive chain, a transmit chain, or both. The radio 330 may be configured to communicate via various wireless communication standards, including, but not limited to, LTE, LTE-A, NR, GSM, UMTS, CDMA2000, Wi-Fi, etc. Each of the antennas 334 may be configured to operate within a different frequency band, a different radio access technology, and/or within a separate WLAN network, in some embodiments.

The AP 104 may be configured to communicate wirelessly using multiple wireless communication standards. For example, as one possibility, the AP 104 may include an LTE or 5G NR radio for performing communication according to LTE or 5G NR, as well as a Wi-Fi radio for performing communication according to Wi-Fi. In such a case, the AP 104 may be capable of operating as both an LTE base station and a Wi-Fi access point. As another possibility, the AP 104 may include a multi-mode radio which is capable of performing communications according to any of multiple wireless communication technologies (e.g., NR and Wi-Fi, NR and UMTS, LTE and CDMA2000, UMTS and GSM, etc.). As still another possibility, the AP 104 may be configured to act exclusively as a Wi-Fi access point, e.g., without cellular communication capability.

As described further subsequently herein, the AP 104 may include hardware and software components for implementing or supporting implementation of features described herein, e.g., to support network bridging according to any of the methods disclosed herein. The processor(s) 304 of the access point 104 may be configured to implement or support implementation of part or all of the methods described herein, e.g., by executing program instructions stored on a memory medium (e.g., a non-transitory computer-readable memory medium). Alternatively, the processor(s) 304 may be configured as a programmable hardware element, such as an FPGA (Field Programmable Gate Array), or as an ASIC (Application Specific Integrated Circuit), or a combination thereof. Alternatively (or in addition) the processor 304 of the AP 104, in conjunction with one or more of the other components 330, 332, 334, 340, 350, 360, and/or 370, may be configured to implement or support implementation of part or all of the features described herein.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A home power distribution system, comprising:
a primary power drop branching into a plurality of circuits, wherein each of the plurality of circuits powers one or more entities in a home, and wherein each of the plurality of circuits operates according to a distinct power phase; and
a plurality of wireless access points each associated with a respective circuit of the plurality of circuits, wherein each wireless access point of the plurality of wireless access points provides wireless transport to bridge between its respective circuit and one or more other circuits of the plurality of circuits, wherein in bridging between the respective circuit and a respective second circuit, each wireless access point is configured to provide a respective alien bridge from a wired domain associated with the respective circuit and a wireless domain associated with a respective second wireless access point of the respective second circuit, and wherein providing wireless transport to bridge between circuits enables internetworking between disparate power phases.

2. The home power distribution system of claim 1, wherein each wireless access point further provides wireless communication services to one or more wireless devices.

3. The home power distribution system of claim 1, wherein each wireless access point is configured to automatically detect a phase of a power distribution of its respective circuit.

4. The home power distribution system of claim 1, wherein each wireless access point operates according to one or more of:
WiFi;
Bluetooth;
Z-Wave;
Zigbee; or
Wi-SUN.

5. The home power distribution system of claim 1, wherein each wireless access point is configured to advertise its availability to a wireless access point designated as domain master, and
wherein the wireless access point designated as domain master is configured to route traffic based at least in part on the advertised availability to accomplish one or both of reduced internetworking latency and increased overall system throughput.

6. A non-transitory computer-readable memory medium comprising program instructions which, when executed by a processor, cause a first wireless access point to:
perform wired communications over a first circuit connected to the first wireless access point, wherein the first circuit operates according to a first power phase;
perform wireless communications with a second wireless access point, wherein the second wireless access point is connected to a second circuit and is not connected to the first circuit, wherein the second circuit operates according to a second power phase different from the first power phase; and
provide wireless transport through the second wireless access point to bridge communications between the first circuit and the second circuit, wherein in bridging communications between the first and second circuits, the first wireless access point is configured to provide an alien bridge from a wired domain of the first circuit and a wireless domain of the second wireless access point, wherein providing wireless transport to bridge communications between the first and second circuits enables internetworking between the first and second power phases.

7. The non-transitory computer-readable memory medium of claim 6,
wherein each of the first and second wireless access points further provide wireless communication services to one or more respective wireless devices.

8. The non-transitory computer-readable memory medium of claim 6, wherein the program instructions are further executable to cause the first wireless access point to:
automatically detect a phase of a power distribution of the first circuit.

9. The non-transitory computer-readable memory medium of claim 6,
wherein each of the first and second wireless access points operate according to one or more of:
WiFi;
Bluetooth;
Z-Wave;
Zigbee; or
Wi-SUN.

10. The non-transitory computer-readable memory medium of claim 6,
wherein the first wireless access point is designated as domain master,
wherein the program instructions are further executable to cause the wireless access point to:
receive an advertised availability from the second access point; and
route traffic based at least in part on the advertised availability to accomplish one or both of reduced internetworking latency and increased overall system throughput.

11. A home power distribution system, comprising:
a circuit configured to power one or more entities in a home;
a first wireless access point wired to the circuit;
a second wireless access point wired to the circuit, wherein the first wireless access point is out of wireless communication range with the second wireless access point; and
an alien bridge comprised within the first wireless access point, wherein the alien bridge is configured to establish communication between the first wireless access point and the second wireless access point through a wired domain associated with the circuit, wherein in establishing communication between the first wireless access point and the second wireless access point through the wired domain associated with the circuit, the alien bridge is provided from the wired domain associated with the circuit to a wireless domain associated with the second wireless access point.

12. The home power distribution system of claim 11, wherein the first and second wireless access points are configured to provide wireless communication services to one or more respective wireless devices.

13. The home power distribution system of claim 11, wherein each of the first and second wireless access points operate according to one or more of:
WiFi;
Bluetooth;
Z-Wave;
Zigbee; or
Wi-SUN.

14. The home power distribution system of claim 11, further comprising:
a primary power drop branching into a plurality of circuits including the circuit,
wherein each circuit of the plurality of circuits operates according to a separate power phase.

15. The home power distribution system of claim 11, wherein the first wireless access point is designated as domain master, wherein the first wireless access point is further configured to:
receive an advertised availability from the second access point; and
route traffic based at least in part on the advertised availability to accomplish one or both of reduced internetworking latency and increased overall system throughput.

* * * * *